United States Patent [19]

Hadley

[11] 4,196,347
[45] Apr. 1, 1980

[54] SECURITY SYSTEMS

[75] Inventor: John Hadley, St. Albans, England

[73] Assignee: Chubb & Son's Lock and Safe Company Limited, London, England

[21] Appl. No.: 923,282

[22] Filed: Jul. 10, 1978

[51] Int. Cl.$^2$ .................. E05B 47/00; H04B 9/00; H04Q 1/00
[52] U.S. Cl. ........................ 455/603; 70/271; 70/DIG. 51; 340/171 R; 340/171 PF; 340/172
[58] Field of Search ............ 250/199; 340/168, 171 R, 340/171 A, 171 PF, 172; 70/263, 266, 271, DIG. 51

[56] References Cited

U.S. PATENT DOCUMENTS

| | | | |
|---|---|---|---|
| 3,564,501 | 2/1971 | Flook | 340/171 PF |
| 3,801,742 | 4/1974 | O'Brien | 340/171 PF |
| 3,829,836 | 8/1974 | Clarke | 340/171 PF |

FOREIGN PATENT DOCUMENTS 1310132 3/1973 United Kingdom .
1351888 5/1974 United Kingdom .

*Primary Examiner*—Howard W. Britton
*Attorney, Agent, or Firm*—Pollock, Vande Sande and Priddy

[57] ABSTRACT

A door security system includes a lock that is released by an electronic control unit carried on the door and activated by radiation from an r.f. oscillator in a user's key unit. The key unit, provided on a finger ring, includes one or more photovoltaic devices that convert light energy received from a lamp on the door to electrical power for the r.f. oscillator. The r.f. emission may be binary-code modulated and the control unit then includes an appropriate modulation-code detector. The door unit may also include a light-source that emits coded pulses of infra-red light and then the key unit includes a circuit to detect whether the infra-red light received is of the appropriate code-format as a condition for activation of the r.f. oscillator.

9 Claims, 5 Drawing Figures

SECURITY SYSTEMS

SUMMARY OF THE INVENTION

This invention relates to security systems.

Security systems for controlling the operation of a door or other barrier have been proposed in which a lock holding the barrier closed is released in response to electromagnetic radiations emitted by a 'key' unit carried by the person seeking access. It is common with such systems to reduce the bulk of the key unit by arranging that the appropriate radiations are emitted as a re-transmission of radio-frequency electromagnetic energy radiation from a high-power source associated with the door or other barrier, the key unit in these circumstances acting merely as a responder that is activated when brought into the vicinity of the barrier. It is one of the objects of the present invention to provide a form of security system which can be used to avoid the necessity for use of a high-power radio-frequency source.

According to one aspect of the present invention the necessity for a high-power source of radio-frequency electromagnetic energy is avoided simply by using light for activation. Furthermore, key means carried, for example, by a person seeking access through a door or other barrier, may be powered electrically entirely from the light energy received. Thus with this aspect of the invention no battery or other power supply need be provided in the key unit and this allows an especially compact form of unit to be constructed. More particularly, there is provided according to this aspect of the present invention a security system comprising: light-source means; key means for responding to light emitted by said light-source means, said key means including oscillator means adapted to be powered electrically to emit electromagnetic radiation, means for converting light energy received rom said light-source means to electrical energy, and means to supply said electrical energy to power said oscillator means to emit said electromagnetic radiation; and receiver means for receiving electromagnetic radiation emitted by said oscillator means, said receiver means including means responsive to the said received electromagnetic radiation to provide manifestation thereof.

Light for activation of the key unit may be obtained from a source of visible light, but infra-red or ultra-violet sources may alternatively be used. An appropriate lens or mirror may be used to focus the light but this is not normally necessary. Furthermore it may be arranged that the light emitted has some predetermined modulation or other detectable characteristic and that activation takes place only if the light received by the key unit is detected as having this predetermined characteristic.

According to a second aspect of the invention, there is provided a security system for controlling operation of a release device, comprising: light-source means, said light-source means including means for emitting light having a characteristic modulation; key means for responding to light emitted by said light-source means, said key means including modulation-detection means for detecting the existence of said modulation in light received by said key means, and means for emitting a control signal in dependence upon detection of said modulation by said modulation-detection means; and means responsive to emission of said control signal by said key means to operate said release device.

The key means may be activated in response to the modulated light to emit radio-frequency electromagnetic energy for reception by a suitable receiver in order to bring about operation of the release device. On the other hand, operation of the release device may be brought about in other ways from the key means.

The modulation used may be conveniently amplitude modulation in accordance with a binary code, but any other modulation may be used. For example, the modulation may be that produced by a signal derived from some specific vocal (or even visual) source; the voice 'print' of the user may be utilized for this purpose.

BRIEF DESCRIPTION OF THE DRAWINGS

A security system in accordance with the present invention and comprising key and door units for use in controlling access through a door, will now be described, by way of example, with reference to the accompanying drawings, in which.

DESCRIPTION OF THE PREFERRED EMBODIMENTS

Figure 1:
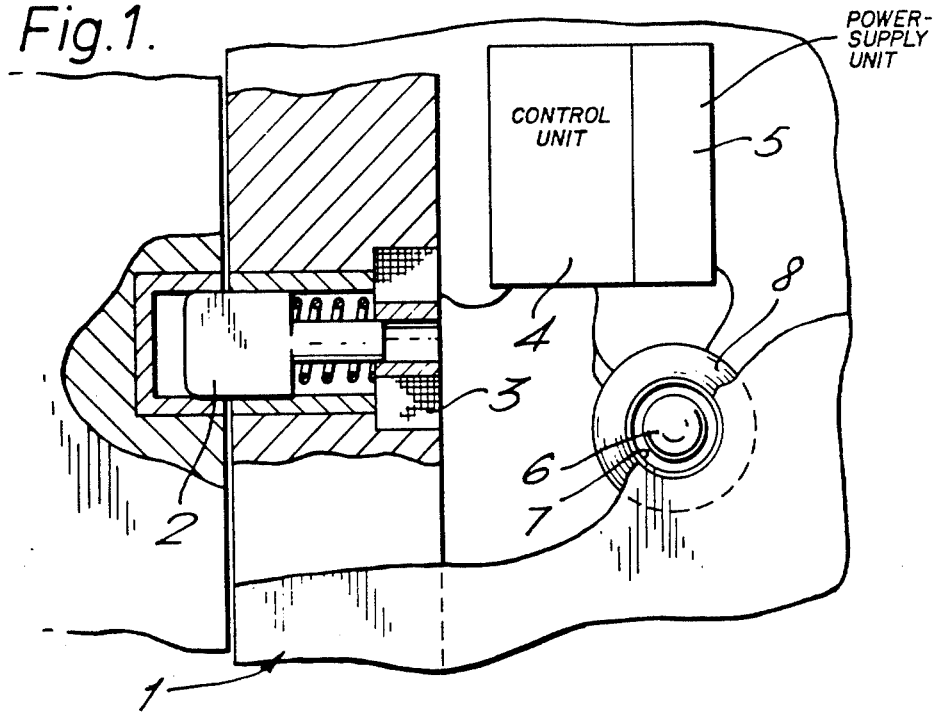
FIG. 1 is a front sectional view of a part of the door as fitted with the door unit of the security system.
Figure 2:
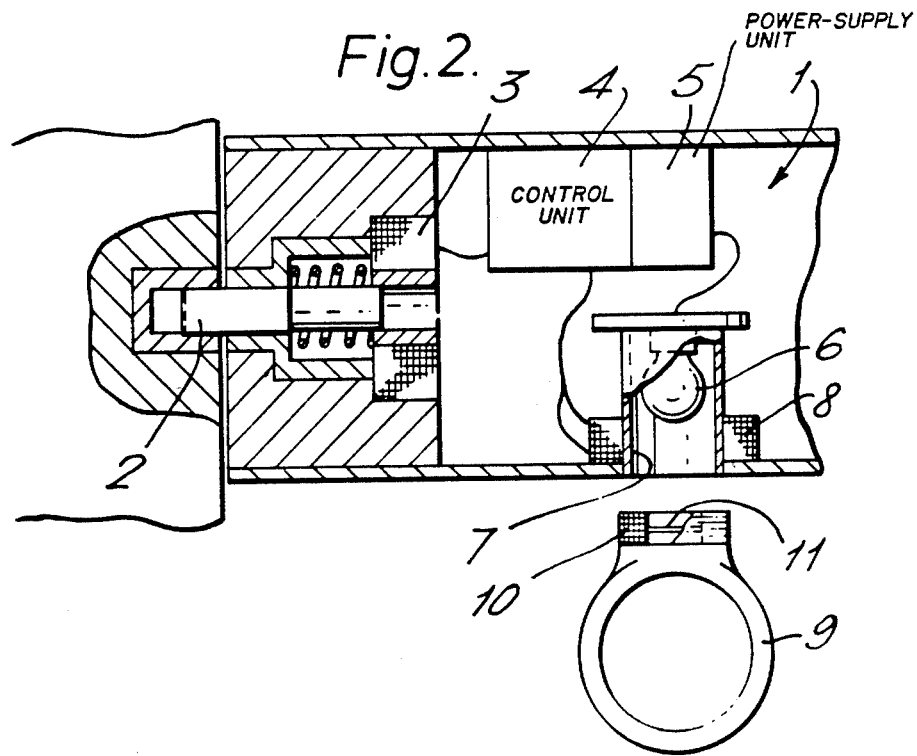
FIG. 2 is a sectional view in plan of the same part of the door as illustrated in FIG. 1, showing also the key unit of the security system.

Referring to FIGS. 1 and 2, the door 1 is fitted with a spring-urged bolt 2 which, as illustrated, serves to lock the door closed and which may be withdrawn to release the door by electrical energization of a solenoid 3. Energization of the solenoid 3 is controlled by an electronic control unit 4 that together with a power-supply unit 5 is also carried by the door 1.

A small-wattage electric lamp 6 is mounted within a recess 7 in the door and is embraced by an electrical coil 8 that is coupled to the unit 4. The lamp 6 is energized from the unit 5 to emit a beam of light from the front of the door.

When the door 1 is to be unlocked a key unit 9 (FIG. 2) is brought up to the door and into the beam of light emitted by the lamp 6. The light energy received activates the unit 9 to emit radio-frequency radiations that are received by the coil 8. Electrical signals in accordance with the received radiations are applied from the coil 8 to the unit 4, and provided these have certain predetermined characteristics, the unit 4 energizes the solenoid 3 so as to withdraw the bolt 2 and thereby enable the door 1 to be opened.

Figure 3:
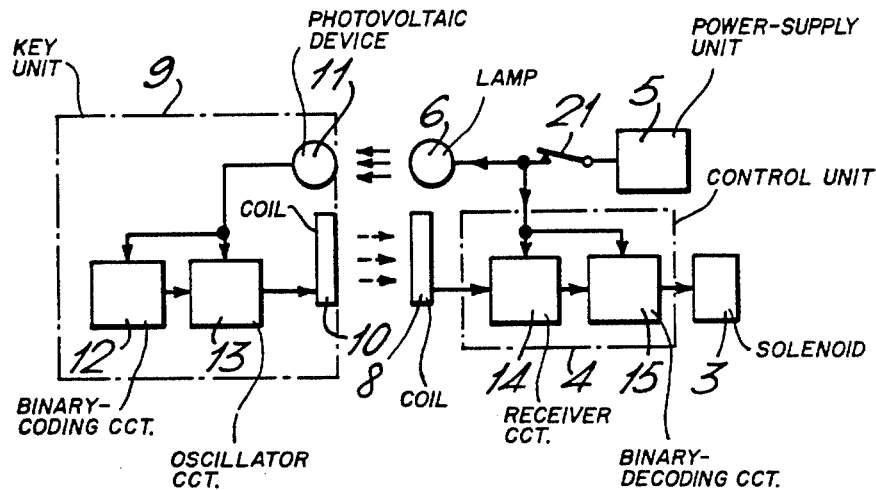
FIG. 3 shows the electrical circuitry of the door and key units of the system in block schematic form.

Referring now also to FIG. 3, the key unit 9 includes a coil 10 corresponding to the coil 8. Within the coil 10 there is mounted a photovoltaic device 11 together with a binary-coding circuit 12 and an oscillator circuit 13. The device 11 responds to the light energy received from the lamp 6 to power, and thereby initiate operation of, the circuits 12 and 13. The circuit 12 is operative to modulate the amplitude of the radio-frequency oscillations generated by the oscillator circuit 13, in accordance with a pre-set binary code. The modulated oscillations, which may for example have a frequency of 8 or 10 MHz, are supplied to the coil 10 to be radiated electromagnetically therefrom.

The signal induced in the coil 8 from the coil 10 of the key unit 9, is supplied to a receiver circuit 14 in the unit 4. The signal received and amplified by the circuit 14 is checked in a binary-decoding circuit 15 of the unit 4 to detect whether it conforms to the appropriate pre-set binary code. The solenoid 3 is energized from the power-supply unit 5 to withdraw the bolt 2, only if conformity of the received signal with the pre-set code is detected.

The power supply unit 5 may involve simply a battery or suitable connection from an external power source such as the mains supply. However it is to be noted that the key unit 9 is powered solely from the light radiations received; no battery (or power-supply connection) is required for activation of the unit 9.

The fact that no battery is required in the key unit 9 enables that unit to be constructed of small size. The various components of the unit can be readily accommodated within the compass of a circle of 0.4 inch diameter, and as illustrated by way of example in FIG. 2, may be provided in the head of a finger ring. They might alternatively be accommodated in an ear ring, a watch strap, a cuff link, a coat or other clothes button, a pen, or a pencil.

It will be clear that the light required to activate the key unit 9 in the system described above, may come from a source independent of the door and its lock mechanism, rather than from a related source such as the lamp 6. However, where additional security is desired the activation of the key unit may be made dependent on reception by it of coded light emission. Modification of the door and key units of the system of FIGS. 1 to 3 to utilize this additional security feature is illustrated in FIG. 4.

Figure 4:
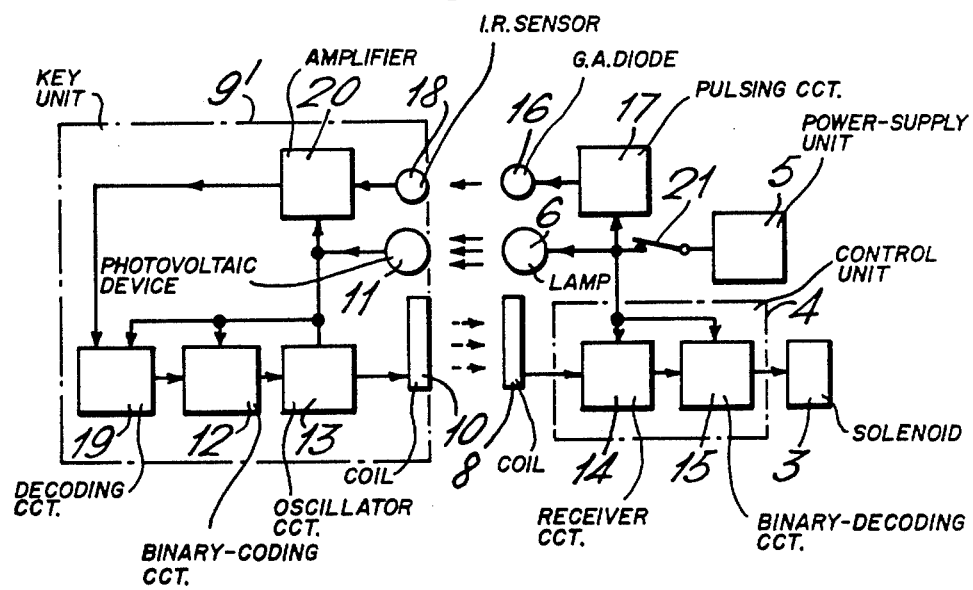
FIG. 4 illustrates a modification of the system of FIGS. 1 to 3.

Referring to FIG. 4, the modification involves the addition to the door unit 4 (or elsewhere) of a further light source 16, which in this case may conveniently be a gallium-arsenide diode, that is stimulated by a pulsing circuit 17 to emit coded pulses of infra-red light. These pulses are received by an infra-red sensor 18 in the modified key unit 9', and the electric pulses in consequence derived by the sensor 18 are supplied to a decoding circuit 19 via an amplifier 20. The circuit 19 detects whether the pulses conform to some predetermined format and only if they do, signals this fact to the coding circuit 12. Operation of the coding circuit 12 and of the oscillator circuit 13 is in this case inhibited, so that no radio-frequency transmission from the key unit 9' to unlock the door takes place, until, and only then so long as, the circuit 19 signals that light-pulses of the necessary format are being received.

The circuit 19 may include a time-delay facility whereby the rate at which it can respond to received pulses or sequences of pulses, is limited. Such limitation is of advantage in reducing the risk that the format of the light-pulse radiation necessary to activate the key unit into electromagnetic radiation, can be determined by experiment trying all the most-likely formats sequentially. If, for example, a coded light-pulse format based on a thirty-bit sequence were used, and the response time of the circuit 19 to each sequence received were 0.1 second, then it would take about three years to explore all the possibilities.

Limitation on the rate at which pulses or pulse sequences can be received and decoded by the unit 4 can also be utilized with advantage. Furthermore, it may be provided that a number of correctly-coded pulse-sequences must be received and detected before the lock is released, or, in the case of the key unit, before the unit is activated.

The same key unit may be used to release other locks, and similarly several key units may be provided to release any one lock. In the latter respect the transmissions from the different key units to release the lock may be identically coded. However, the codings may be different (as for example where there is to be a master key-unit capable of releasing several locks), in which case it will be necessary to pre-set the alternative, acceptable codings into the decoding circuit 15; the pre-setting may be accomplished by providing that the unit 4 has a priming phase during which it "remembers" the codings applicable to each key unit presented to it.

Although with the system described above only one key unit is required to obtain release of the lock, it is readily possible to provide that the lock will be released only if two or more different key units are presented to it together, or one after the other in any, or some specific, order.

Where the door 1 is the door of a house or is otherwise to bear a number or other identification, this identification may conveniently be provided on a transparent or transluscent disc that covers the recess 7 so as to be illuminated for easier recognition. The disc may be hinged so that it can be swung out of the path of the light from the lamp 6 while the key unit is being operated to unlock the door.

As illustrated in FIGS. 3 and 4, a switch 21 may be included in the system to enable the power supply, in particular to the lamp 6, to be interrupted. The switch 21 may be used to conserve power, but it may also be used to enable the whereabouts of the lamp 6 to be concealed. In this connection also, it may be arranged that the switch 21 is closed only in response to maintained pressure on a handle of the door, or is closed for a limited period only, after first pressure on the handle or some other member.

The security system of the present invention may be provided in a simpler form than so far described. Basic circuitry that may be used in this respect is illustrated in FIG. 5.

Figure 5:
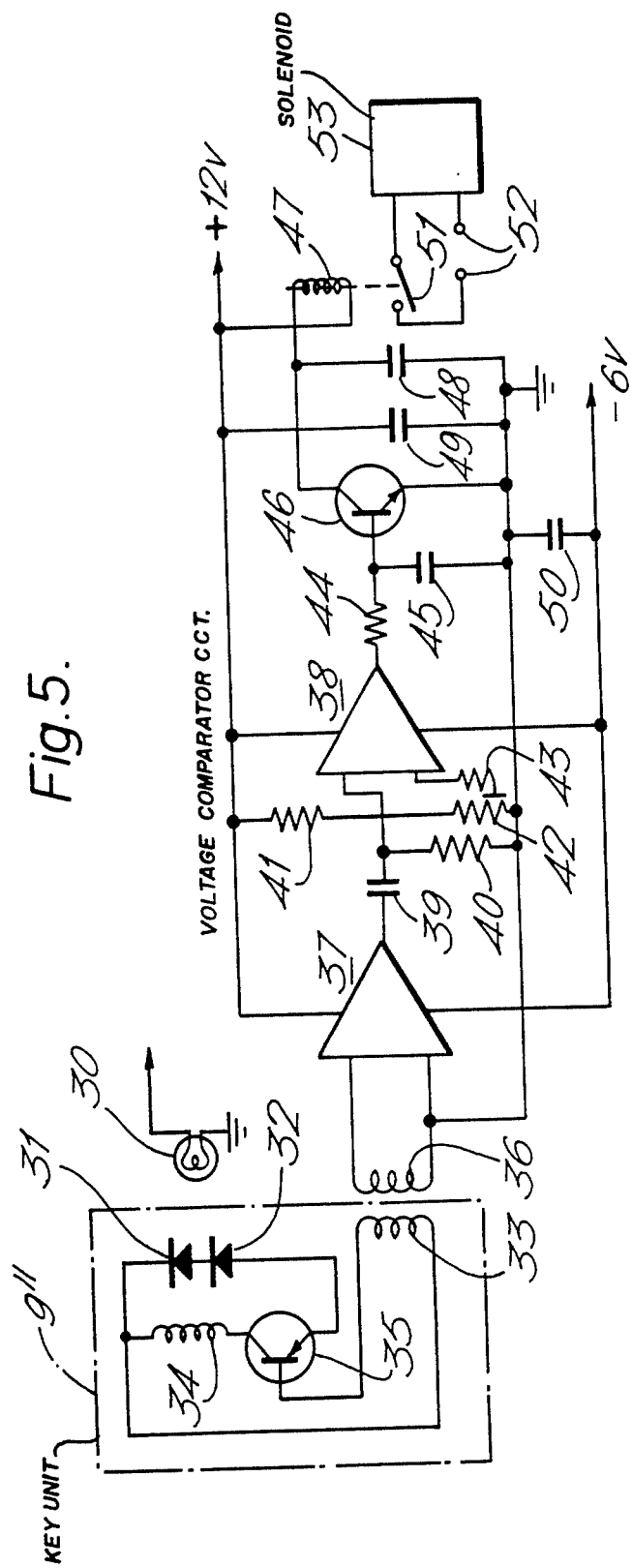
FIG. 5 shows the electrical circuitry of the key and door units of a simplified form of the security system of FIGS. 1 to 3.

Referring to FIG. 5, light emitted by a 2.2 watt electric lamp 30 mounted on (or in) the door, is received in the key unit 9" by two serially-connected photovoltaic cells 31 and 32 (for example, MS 1A silicon cells). The cells 31 and 32 are mounted within coaxial coils 33 and 34 of the unit 9" which are formed, for example, by ten turns and twenty turns respectively of 34 s.w.g. insulated wire. The coils 33 and 34 are connected together with the cells 31 and 32 to a transistor 35 (for example, a BFS 40 'Micro E' transistor) to form an oscillator circuit having an oscillation frequency of 8 MHz.

The circuit mounted with the door includes a coil 36 formed by six turns of 34 s.w.g. insulated wire wound to a diameter of 0.067 inches. Signals induced in the coil 36 from the coil 33 of the oscillator key unit 9" are applied to the two stages 37 and 38 of a dual voltage-comparator circuit provided, for example, by an integrated circuit of the type SN 72720. The first stage 37 acts as a linear amplifier of the radio-frequency signal induced in the coil 36, and supplies the amplified signal via a capacitor 39 (for example of 82 picofarad) to the second stage 38 across a resistor 40 (for example of 2.2 kohms). This amplified signal is compared in the second stage 38 with a direct-current reference which is established by a potentiometric chain formed by serially-connected resistors 41 and 42 (for example of 3.9 kohm and 100 kohms respectively), and which is applied to stage 38 via a resistor 43 (for example of 2.2 kohm).

Stage 38 is operated beyond the linear region of its characteristic and such that the input signal provides a rise in its mean output potential. The component of the input frequency in the output of stage 38 is removed via a resistor 44 and capacitor 45 connected in series (for example of 2.2 kohm and 100 microfarad respectively) so that a steady signal appears across the capacitor 45. This latter signal is supplied to the base electrode of a transistor 46 (for example of the type BC 107A) that is connected in the grounded-emitter circuit configuration to be normally non-conductive.

Transistor 46 is rendered conductive by the signal appearing across the capacitor 45, and when conductive energizes a relay winding 47. Three capacitors 48, 49 and 50 (each, for example, of 0.1 microfarad) are coupled in the circuit for smoothing purposes, and energization of the relay winding 47 causes a switch contact 51 of the relay to close. This completes a circuit between power-supply terminals 52 for energization of a solenoid 53 that controls release of the door bolt.

I claim:

1. A security system comprising: light-source means; key means for responding to light emitted by said light-source means, said key means including oscillator means adapted to be powered electrically to emit electromagnetic radiation, means for converting light energy received from said light-source means to electrical energy, and means for supplying said electrical energy to power said oscillator means to emit said electromagnetic radiation; and receiver means for receiving electromagnetic radiation emitted by said oscillator means, said receiver means including means responsive to the said received electromagnetic radiation to provide manifestation thereof.

2. A security system according to claim 1 wherein said light-source means includes means to emit light energy having a predetermined detectable characteristic, and wherein said key means includes detector means to detect the existence of said predetermined characteristic in light received by said key means, and means for activating said oscillator means to emit said electromagnetic radiation only in response to the condition in which said predetermined characteristic is detected by said detector means.

3. A security system according to claim 2 wherein said light-source means includes means for modulating said light energy emitted thereby, and wherein said detector means includes means to detect the existence of said modulation in light received by said key means.

4. A security system according to claim 1, claim 2 or claim 3 wherein said key means includes means coupled to said oscillator means to effect modulation of said electromagnetic radiation emitted by said oscillator means, and wherein said receiver means includes means for detecting the existence of said modulation in the said received electromagnetic radiation.

5. A security system according to claim 1, claim 2 or claim 3 wherein said receiver means includes a releasable locking device, and means responsive to said manifestation of the received electromagnetic radiation to release said locking device.

6. A security system for controlling operation of a release device in accordance with selectively presentable key means comprising: light-source means, said light-source means including means for emitting light having a characteristic modulation; key means that is selectively presentable to said light-source means in said system for responding to light emitted by said light-source means, said key means including modulation-detection means for detecting the existence of said modulation in light received by said key means, and means for emitting a control signal in dependence upon detection of said modulation by said modulation-detection means; and means responsive to emission of said control signal by said key means to operate said release device.

7. A security system according to claim 6 wherein said light emitted by said light-source means is infra-red light.

8. A security system according to claim 6 wherein said means for emitting said control signal is an electrical circuit adapted to be powered electrically, and wherein said key means includes means responsive to light energy received from said light-source means to power the said electrical circuit to enable emission of said control signal thereby.

9. A security system according to claim 8 wherein said light-source means includes in addition to said means for emitting light having said characteristic modulation, further means for emitting light to power said electrical circuit.

* * * * *